(12) United States Patent
Carman

(10) Patent No.: US 9,568,943 B1
(45) Date of Patent: Feb. 14, 2017

(54) CLOCK-BASED DISTRIBUTED DATA RESOLUTION

(71) Applicant: Amazon Technologies, Inc., Seattle, WA (US)

(72) Inventor: Charles Alexander Carman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 108 days.

(21) Appl. No.: 14/697,503

(22) Filed: Apr. 27, 2015

(51) Int. Cl.
*G06F 1/00* (2006.01)
*G06F 17/30* (2006.01)
*G06F 1/10* (2006.01)
*G06F 11/14* (2006.01)

(52) U.S. Cl.
CPC ............. *G06F 1/10* (2013.01); *G06F 11/1446* (2013.01); *G06F 2201/84* (2013.01)

(58) Field of Classification Search
CPC ............. G06F 11/1435; G06F 11/1458; G06F 17/30088; G06F 2201/84; G06F 17/30067; G06F 1/12; G06F 1/14; G06F 1/10; G06F 5/06; G06F 13/1689; G06F 1/08; G06F 1/04; G06F 1/3202; G06F 9/4825; G06F 11/0757; G11C 7/22
See application file for complete search history.

(56) References Cited

U.S. PATENT DOCUMENTS

| | | | | | |
|---|---|---|---|---|---|
| 5,471,631 | A | * | 11/1995 | Beardsley | G06F 11/0775 702/178 |
| 5,603,024 | A | * | 2/1997 | Goldring | G06F 11/1471 707/615 |
| 7,743,083 | B2 | * | 6/2010 | Bhogi | G06F 9/466 707/826 |
| 7,974,943 | B2 | * | 7/2011 | Gilbert | G06F 17/30575 707/610 |
| 8,996,465 | B2 | * | 3/2015 | Mielenhausen | G06F 17/30362 707/611 |
| 2012/0150802 | A1 | * | 6/2012 | Popov | G06F 11/1487 707/635 |
| 2013/0103659 | A1 | * | 4/2013 | Larson | G06F 17/30575 707/703 |
| 2013/0110767 | A1 | * | 5/2013 | Tatemura | G06F 17/30315 707/607 |

* cited by examiner

*Primary Examiner* — Zahid Choudhury
(74) *Attorney, Agent, or Firm* — Davis Wright Tremaine LLP

(57) ABSTRACT

Techniques to generate a distributed data structure using monotonic clock times are described herein. A set of data events are received at a plurality of replica locations and, based on delivery times, creation times, and timeout times, the data events are stored within a convergent replicated data structure. The data events are then ordered within the convergent replicated data structure based on the corresponding timeout times being less than a time value obtained from a locally accessible clock associated with each replica locations. The distributed data structure is then generated from the ordered data events by recursively selecting data events from the replica locations.

20 Claims, 13 Drawing Sheets

CLOCK-BASED DISTRIBUTED DATA RESOLUTION

BACKGROUND

Modern computer systems are frequently distributed across multiple locations where each of the locations may perform a portion of the tasks associated with the computer system. Such computer systems frequently utilize distributed data storage in multiple locations to store shared data items so that such data items may be made available to a plurality of consumers. These computer systems may also provide access to data clients that may allow those data clients to alter the contents and/or structure of the shared data items in one or more of the multiple locations. When multiple clients attempt to alter the same shared data item, a contention may occur that must be resolved in order to avoid the loss of potentially important data. Some techniques to resolve such contentions may involve establishing communications between the locations to determine a consensus as to the data items that should be retained. Other techniques to resolve such contentions may involve electing a leader and using the leader to determine the consensus. However, these techniques may require additional network resources and time-consuming processes in order to reach the consensus and may lead to a degraded user experience due to delays in reaching the consensus, increased resource usage, or loss of critical data changes.

BRIEF DESCRIPTION OF THE DRAWINGS

Various embodiments in accordance with the present disclosure will be described with reference to the drawings, in which.

DETAILED DESCRIPTION

Figure 1:
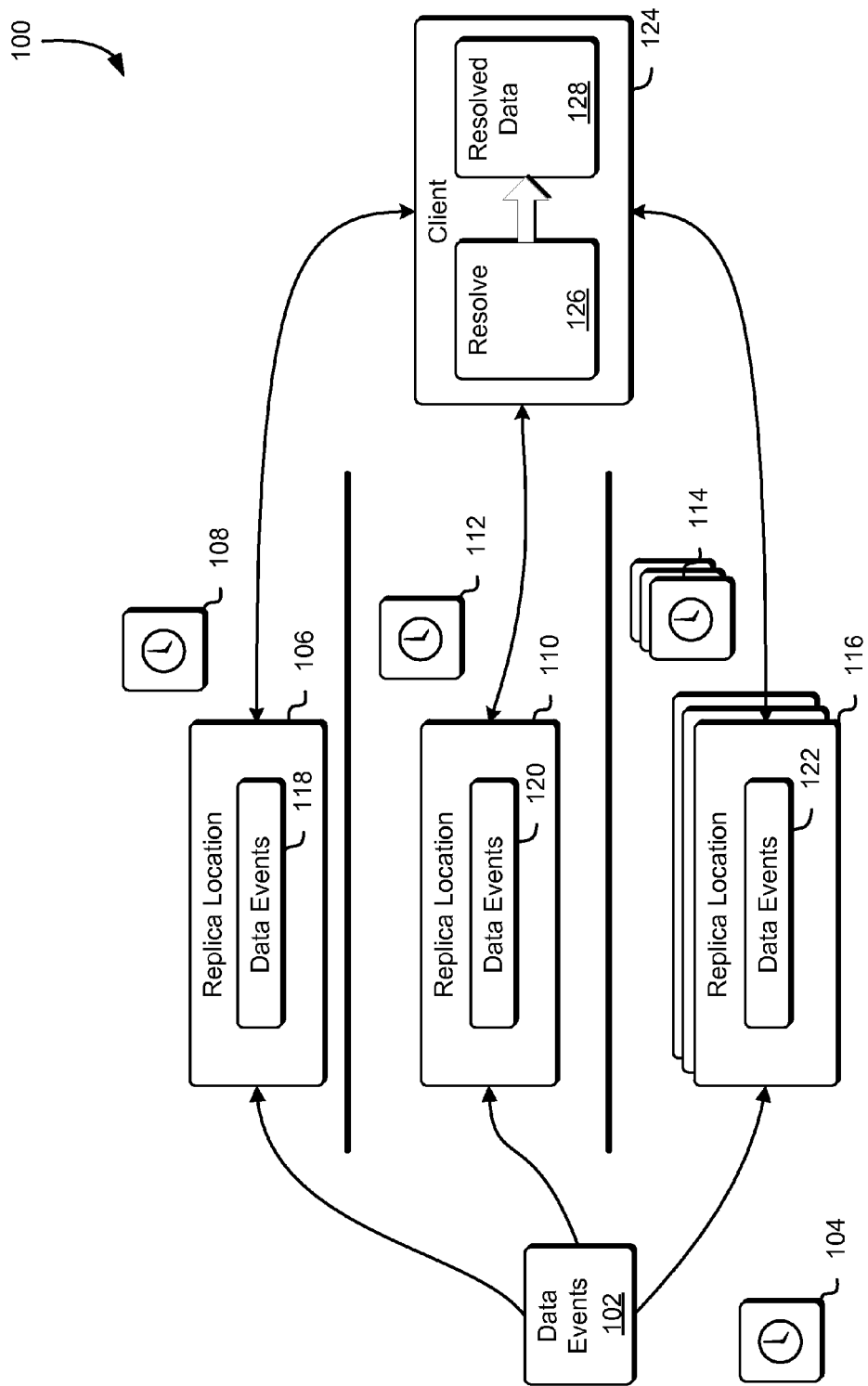
FIG. 1 illustrates an example environment where distributed data may be ordered using locally accessible clocks.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems, and processes for populating a distributed data structure in a single and unambiguous order using an accurate wall-clock. The methods, systems, and processes described herein allow the population of the data structure without using a consensus protocol such as voting or mastering and thus may avoid costly network communications between replica sites (also referred to herein as "replicas") or loss of consensus when, for example, a master or leader becomes unavailable. Consensus as to the order of events that alter the distributed data structure may instead be predicated on an accurate wall-clock time, when such wall-clock time is determinable at multiple locations across a distributed system.

The increase in availability of accurate clocks (also referred to herein as "wall-clocks") that may be integrated with computer systems provides a method for precisely and accurately determining local time. For example, a global positioning system enabled Cesium atomic clock may be installed within a computer system environment and may be used to synchronize a time server to a recognized true or global time. Installing such clocks in multiple locations of a distributed computer system environment may allow time servers at each of these multiple locations to synchronize their clocks to within milliseconds (ms) or less. Additionally, the availability of network time protocol ("NTP") and precision time protocol ("PTP") servers may further increase this synchronization to within microseconds (μs) or less.

Synchronized time values across a distributed system may have their variance from true time (an agreed upon or hypothetical value for the actual time) predicted and/or determined and such variances may be used to establish time intervals associated with any particular time value. For example, if it is known that a time server at a location within a distributed system is, to within a certain probability (also referred to herein as a "boundary probability"), always within 20 microseconds of true time, any time measurement $t_i$ from that location may be specified as an interval $[t_i-20 \text{ μs}, t_i+20 \text{ μs}]$. In the interval $[t_i-20 \text{ μs}, t_i+20 \text{ μs}]$, the time "$t_i-20$ μs" is a lower time or a lower time bound and the time "$t_i+20$ μs" is an upper time or an upper time bound. Similarly, if it is known that a time server at a location within a distributed system is, to within a certain probability, always within 2 milliseconds of true time (e.g., because of a less accurate clock), any time measurement $t_j$ from that location may be specified as an interval $[t_j-2 \text{ ms}, t_j+2 \text{ ms}]$ (which may also be expressed as $[t_j-2000 \text{ μs}, +2000 \text{ μs}]$).

Such time intervals may be used to establish a strict ordering of events associated with a distributed system without costly consensus protocols by using the strictly monotonically increasing property of elapsed time to determine a consensus order. Consider, for example, a logging service for a distributed system that allows multiple clients to send log messages, and where the logging service is also distributed (i.e., maintained in multiple locations). In order to maintain a correct log, the correct order of the distributed events must be determined. In this example, a first client may send a first log entry to the multiple locations that may include a time (measured at the first client) and an interval associated with that first client. The first log entry may be received at the multiple locations at different times and in different orders, based on a variety of transmission factors. The time interval associated with the first log entry may be further adjusted at each of the locations based on the wall clock of each of the multiple locations and/or known transmission times between the first client and the respective location.

Meanwhile, a second client may also send a log entry to the multiple locations with a time and a time interval associated with the second client. The second log entry may also be received at the multiple locations at different times and in different orders, again based on a variety of transmission factors and the time interval associated with the second log entry may be further adjusted at each of the locations based on the wall clock of each of the multiple locations and/or known transmission times between the second client and the respective location. Because of the different transmission factors and time, the different locations may have received the two log entries in different orders, and each may also store the entries based on the time intervals associated with the entry in a different order.

It is important to note that, at this point, there may not be a consensus as to the correct order of the entries. For example, the two entries may have been sent within their respective margins of error (e.g., if their time intervals overlap) and/or may be stored in a different order based on transmission times. However, a consensus may later be established when a request is made to read the log back to a client. The client may request the log data from each of the locations and, if a required number of the multiple locations can agree on the proper sending order of the two log entries, the order may be determined. The required number may be a majority, a quorum (a majority of available locations), or some other value. The required number may be determined by adding each order of the log entries to a set of orders (e.g., a set of pairs of first log entries and second log entries where each pair indicates an order), determining the most common (or most frequent) order of the set of orders (based on, for example, the most common directed edges and/or the most frequent directed edges that connect the pair), removing the less common (or less frequent) orders from the set of orders and counting the number of items in the remaining set of orders (also referred to herein as the cardinality of the set). If the cardinality of the set exceeds a threshold value (e.g., more than half of the locations for a majority or more than half of the available locations for a quorum) then the order may be determined. Once the order is established, it may then be sent back to the non-conforming locations to establish a system-wide consensus.

FIG. 1 illustrates an example environment 100 where distributed data may be ordered using locally accessible clocks in accordance with at least one embodiment. One or more data events 102 may be generated within a distributed computer system. The data events may be related to populating a distributed data representation (also referred to herein as a "distributed data structure") such as a distributed database, a distributed log, a distributed queue, a distributed message queue, a distributed graph, or some other distributed data representation. A distributed data set is a set of data that may be stored in a plurality of locations within a distributed computer system. A distributed data set is one that may be made available to clients from that plurality of locations within the distributed computer system. For example, the logging system described above may be a distributed logging system in that log entries may be provided by multiple services and may be stored in multiple locations within the computer system (e.g., within different data centers, within different regions, or according to some other distribution). In another example, a distributed message queue may be configured to receive messages from a plurality of services and process those messages. Processing those messages may include, for example, forwarding those messages to other services for further action.

In an example, data events 102 may be generated by a plurality of client web-based applications that, as a result of user interactions with those client web-based applications, may perform operations to create and/or alter entries in a distributed database. When a client performs a creation of an entry in the distributed database or an alteration of an entry in the distributed database, one or more data events may be created. For example, a request by a client application to perform an operation to create a new entry in the distributed database may generate a data event indicating the time of the operation and may include data related to the new entry. Each data event may then be sent to multiple sites within the distributed computer system to cause the population of the distributed database as described below.

In another example, the data events may be generated by a plurality of services running on a distributed computer system, which may be configured to produce log entries recording service-related activities. Each service-related activity from each service may result in a log entry which may, in turn, cause the service to generate a data event indicating the time of the service-related activity and may include data related to the log entry (e.g., the service, the activity, a result of the activity, etc.). Again, each data event may then be sent to multiple sites within the distributed computer system to cause the population of the distributed log.

Various distributed data structures may also be produced using the techniques described herein, particularly in embodiments where the resulting data structure may be dependent on the order that data events are received. A queue data structure, which is a "first in, first out" (or "FIFO") data structure may have a different resulting data structure depending on the order of the data events. For example, an event to add an item "A," followed by an event to add an item "B," and followed by an event to add an item "C" would not result in the same queue as the queue that would result from, for example, an event to add an item "A," followed by an event to add an item "C," and followed by an event to add an item "B." The first queue would have "A," then "B," and then "C" while the second queue would have "A," then "C," and then "B." Similarly, a graph data structure, which is a structure of nodes and edges where the nodes represent data items and the edges represent relationships between pairs of nodes may be created differently when different data items nodes are generated in different orders. As may be contemplated, the types of data structures that may be used to resolve the data items based on the data events described herein are merely illustrative examples and other such data structures may be considered as within the scope of the present disclosure.

In an embodiment, data events 102 may be generated with a time entry indicating when the data event occurred. The time entry associated with the data events may be provided by a locally accessible clock 104 as described above. Each generator of data events 102 may have a different locally accessible clock 104 when, for example, the data events 102 come from a plurality of sources that may be in a plurality of locations.

In a distributed computer system, the data events may be sent to a plurality of locations within the distributed computer system. These locations (referred to herein as "replica locations" or simply as "replicas") may be configured to receive the data events 102 and provide an organizational structure to the data events 102 that may be used to determine the order that the data events occur. As described above, the order of the data events 102 may be important for determining the resulting order and/or structure of the database, log, queue, graph, or other data structure. In the example illustrated in FIG. 1, the data events 102 may be sent to a first replica location 106, which may receive the data events and may use the received data events to produce a local representation of the data events 118. The first replica location 106 may produce the local representation of the data events using information obtained from a locally accessible clock 108. The time data provided by the locally accessible clock 108 may differ from and/or otherwise not be synchronized with the time data provided by the locally accessible clock 104 used in conjunction with generating the data events 102.

The data events 102 may also be sent to a second replica location 110, which may receive the data events and may use the received data events to produce a local representation of the data events 120. The second replica location 110 may produce the local representation of the data events using information obtained from a locally accessible clock 112. The time data provided by the locally accessible clock 112 may differ from and/or otherwise not be synchronized with the time data provided by the locally accessible clock 104 used in conjunction with generating the data events 102. The time data provided by the locally accessible clock 112 may also differ from and/or otherwise not be synchronized with the time data provided by the locally accessible clock 108 associated with the first replica location 106.

The data events 102 may also be sent to one or more other replica locations 116, which may also receive the data events and may use the data events to produce one or more other local representations of the data events 122. The one or more other replica locations 116 may then produce local representations of the data events using information obtained from one or more locally accessible clocks 114 as described above. As with the time data provided for the first replica location 106 and with the time data provided for the second replica location 110, the time data provided by the one or more locally accessible clocks 114 may differ from and/or otherwise not be synchronized with the time data provided by the locally accessible clock 104 used in conjunction with generating the data events 102, the time data provided by the locally accessible clock 108, and/or the time data provided by the locally accessible clock 112.

As data events 102 may arrive at the replica locations in different orders and/or may not arrive at the replica locations at all, the local representation of the data events 118 may differ from the local representation of the data events 120, and one or both of these may also differ from one or more of the one or more other local representations of the data events 122. For example, a set of three data events (e.g., an event for data item "A," an event for data item "B," and an event for data item "C") may be sent to the first replica location 106, the second replica location 110, and one or more other replica locations 116. Because the events may arrive at the replica locations in different order, the first local representation of the data events 118 at the first replica location 106 may have data items "A," "B," and "C" in that order, the second local representation of the data events 120 at the second replica location 110 may have data items "B," "C," and "A" in that order, and the one or more other local representations of the data events 122 may have zero, one, two, or three of the data items in any of a number of permutations of possible orders. It is important to note that the replica locations may use the time data associated with the data events 102 as well as the time data obtained from locally accessible clocks to produce the local representations of the data events. For example, a data event may have a creation time (a time when the event occurred) or a message time (a time when the message was generated). A data event may also have a timeout time (a time beyond which the event is no longer valid and/or should be discarded), that may be based on the creation time or message time. A replica location may use these times to determine, based on a locally accessible clock, whether to accept a data event, whether to reject a data event, how to order data events, whether to delay acceptance of a data event, whether to delay rejection of data events, whether to delay ordering of data events, or as criteria for performing one or more other operations associated with data events.

As described above, the local representations of data events may vary from each other. However, the order of the data items may be resolved from these varying local representations of data events when a client 124 performs one or more operations to resolve 126 the data order. The client 124 may resolve 126 the data order by requesting information from the local representations of the data events and using that information to produce a consensus order of the data events. For example, if a majority (or a quorum) of local representations of data events show that an event associated with data item "A" occurred prior to an event associated with data item "B," then the client 124 may use that as consensus evidence that data item "A" precedes data item "B." Additional requests for information from the local representations of the data items may be used to further resolve the order of data events, allowing the client to produce a set of resolved data 128 with a consensus order. In an embodiment, the client 124 may also be configured to generate one or more data events 102 so that, for example, the client 124 may produce data events to one or more replica locations and then may resolve 126 the data order by requesting information from the local representations of the data events and using that information to produce a consensus order of the data events.

The operations that produce the local representations of the data events described herein may vary depending on the type of data that may be produced in association with the data events 101 as well as on the structure of the resolved data 128. In an illustrative example, consider data events 102 produced as messages from processes that will be resolved into an ordered queue. Each replica may first receive the data events with a message, a time, and a timeout as described above. If the message is not null, and if the message has a valid sender, the replica may first determine whether the message has timed out (e.g., whether the message is still valid). If the message has timed out, the message may be rejected and not stored in the local representation. Similarly, the message may be rejected if the message is far enough in the future to be potentially spurious.

The operations to resolve 126 the data from the replicas may also vary depending on the type of data that may be produced in association with the data events 101 as well as on the structure of the resolved data 128. Continuing to consider the data events 102 as messages from processes that will be resolved into an ordered queue, the client may first query each replica to attempt to resolve that replica's local queue representation of the data events 102. In order to resolve a replica's local queue representation of data events, the client 124 may first determine a sequence of timeout values of the data events 102 ordered from the lowest timeout (i.e., the first timeout) and proceeding to the latest timeout (i.e., the last timeout). This order may be determined by recursively selecting the lowest timeout of the unresolved (or unexpired) timeouts. From this ordered sequence of timeout values, a queue order for the local representation may then be determined which is based on the unexpired timeout values. The client 124 may then use these queue orders for the local representations to reach a consensus by, for each data item with an unexpired timeout, querying other replica sites for corresponding data items with unexpired timeouts until a consensus is reached. A consensus may only be reached if a majority (or quorum) of replicas respond before the timeouts occur. If an insufficient number of replicas respond with corresponding data items so that a quorum is not reached before the timeouts occur, then the data items may be discarded.

Figure 2:
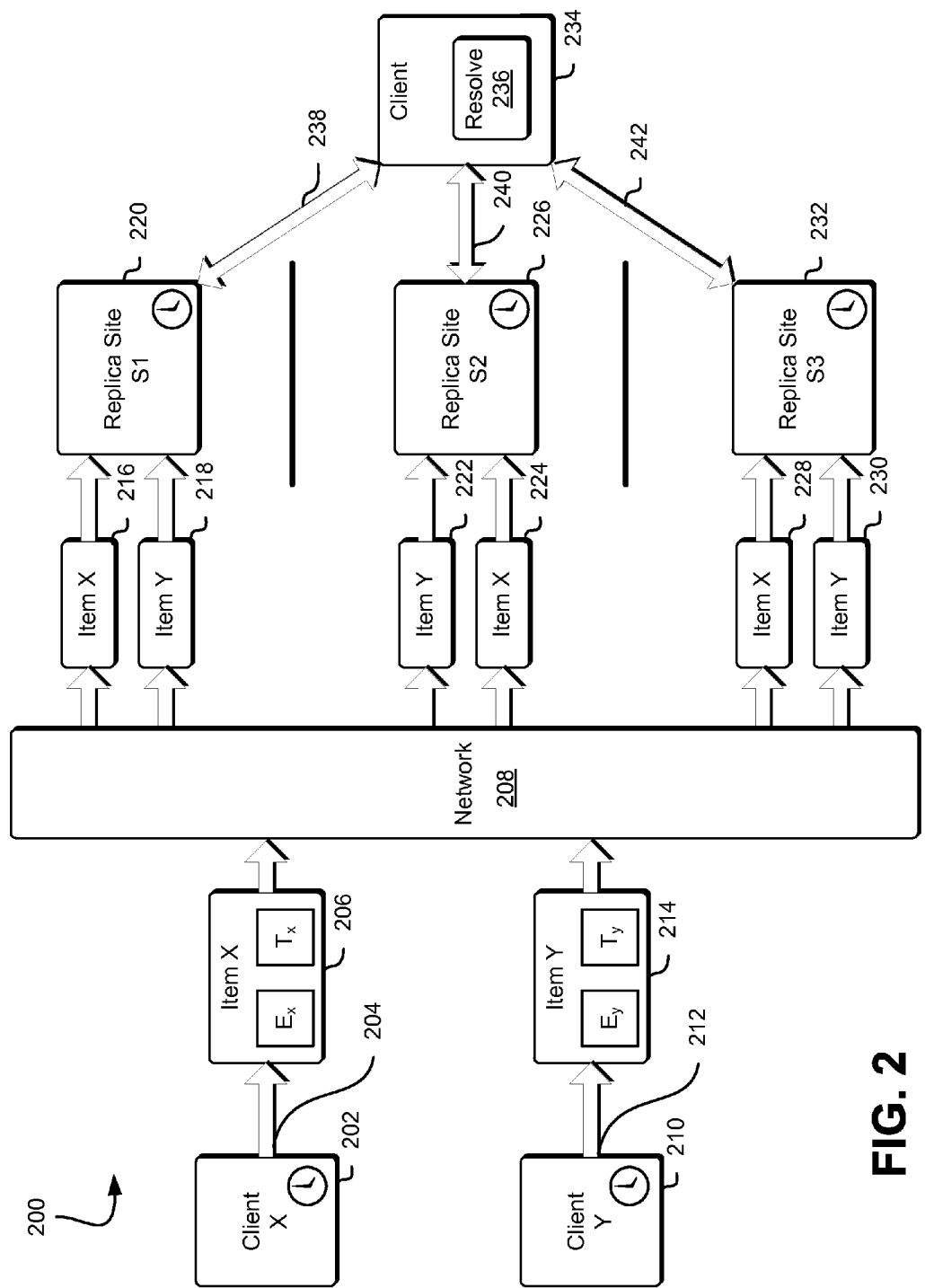
FIG. 2 illustrates an example environment where data from multiple clients may be sent to distributed locations and the order may be resolved using locally accessible clocks.

FIG. 2 illustrates an example environment 200 where data from multiple clients may be sent to distributed locations and the order may be resolved using locally accessible clocks as described in connection with FIG. 1 and in accordance with at least one embodiment. FIG. 2 illustrates a system with two clients, each of which produces a data event that is sent to three replica sites. A first client 202 (denoted as "Client X") with a locally accessible clock may produce 204 a data item 206. The data item 206 (also referred to as "Item X") has an event $E_x$ which occurs at time $T_x$. For illustrative purposes, the event $E_x$ may be, for example, a request to set a variable "A" in a distributed data set to the value 0. Meanwhile, a second client 210 (denoted as "Client Y") with a locally accessible clock may produce 212 a data item 214. The data item 214 (also referred to as "Item Y") has an event $E_y$ which occurs at time $T_y$. For illustrative purposes, the event $E_y$ may be a request to set the variable "A" in the distributed data set to the value 1. In the example illustrated in FIG. 2, the time $T_x$ and the time $T_y$ may be approximately the same time and, as described herein, each of these times may be expressed as a time interval indicating a margin of error and/or an amount of deviation from true time.

The data item 206 and the data item 214 may be sent to one or more replica sites as described in connection with FIG. 1 over a network 208. The network 208 may be the Internet or some other such network as described below. The network 208 may also be some other type of transport layer, including a multicast or broadcast transport. The data item 206 and the data item 214 may arrive at a first replica site 220 with a locally accessible clock (denoted as "Replica Site S1"). In the example illustrated in FIG. 2, the data item 206 arriving at the first replica site 220 corresponds to "Item X" 216 and the data item 214 arriving at the first replica site 220 corresponds to "Item Y" 218. In the example illustrated in FIG. 2, "Item X" 216 arrives at the first replica site 220 before "Item Y" 218. In an embodiment, a replica site may receive an item and may respond to the client. For example, a replica site may respond to the client with a time value corresponding to the deliver time at the replica site as described herein. When a replica site responds with a time value, the replica site may send the response after a delay that may be based on the timeout value $T_x$.

The data item 206 and the data item 214 may also arrive at a second replica site 226 with a locally accessible clock (denoted as "Replica Site S2"). In the example illustrated in FIG. 2, the data item 206 arriving at the second replica site 226 corresponds to "Item X" 224 and the data item 214 arriving at the second replica site 226 corresponds to "Item Y" 222. In the example illustrated in FIG. 2, "Item Y" 222 arrives at the second replica site 226 before "Item X" 224.

Finally, the data item 206 and the data item 214 may arrive at a third replica site 232 with a locally accessible clock (denoted as "Replica Site S3"). In the example illustrated in FIG. 2, the data item 206 arriving at the third replica site 232 corresponds to "Item X" 228 and the data item 214 arriving at the third replica site 232 corresponds to "Item Y" 230. In the example illustrated in FIG. 2, "Item X" 228 arrives at the third replica site 232 before "Item Y" 230.

As illustrated above, each of the replica sites may have a different local representation of the order of "Item X" and "Item Y" based on event times $T_x$ and $T_y$ and also based on the arrival times. A client 234 may resolve 236 the order by querying the replica sites. In the example illustrated in FIG. 2, the client 234 first queries 238 the first replica site 220 and then queries 240 the second replica site 226 to resolve 236 the order. If the first replica site 220 and the second replica site 226 indicate the same order (and, as illustrated in FIG. 2, those two replica sites form a quorum or a majority), then it may not be necessary for the client 234 to query 242 the third replica site 232 to form a consensus. Conversely, if the first replica site 220 and the second replica site 226 do not indicate the same order, then the client 234 may query 242 the third replica site 232 to form a consensus if the order of the third replica site 232 agrees with either the order in the first replica site 220 or the order in the second replica site 226. As described above in connection with FIG. 1, the client 234 may be the same as the first client 202 or may be the same as the second client 210. That is, the client 234, in addition to performing operations to resolve 236 the order, may also produce 204 data items or produce 212 data items.

Figure 3:
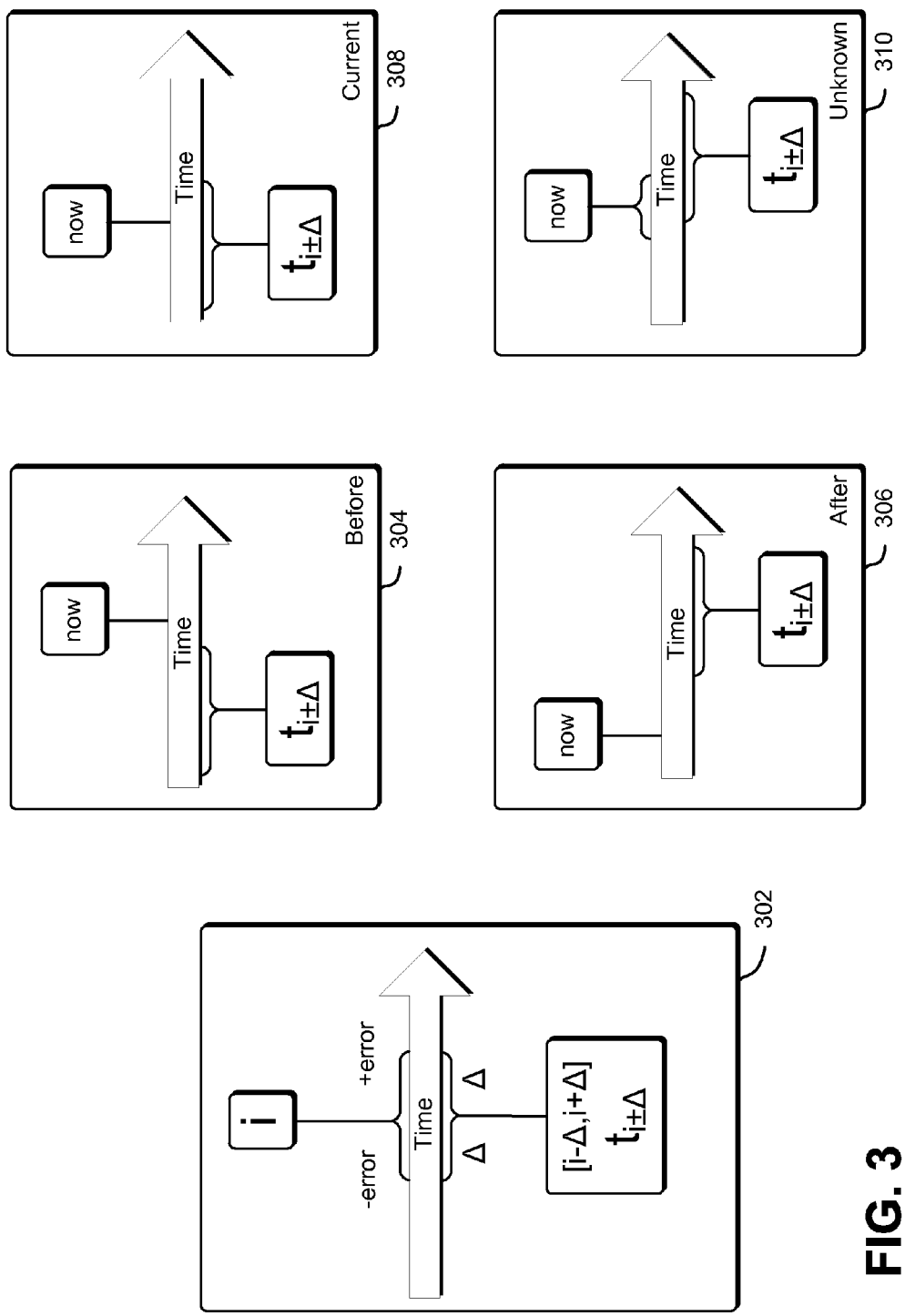
FIG. 3 illustrates example diagrams of time intervals and time interval order determination.

FIG. 3 illustrates example diagrams of time intervals and time interval order determination as described in connection with FIG. 1 and in accordance with at least one embodiment. A time interval 302 may be produced based on a time "i" and an error value for the time. As described above, this error value may be based on the amount that the locally accessible clock associated with the time interval 302 varies from true time. This error, denoted as Δ (the Greek letter "delta"), may then define a lower bound on the time "i" and an upper bound on the time "i" so that there is a high probability that the time "i" falls within the true time interval [i−Δ, i+Δ]. As used herein, this time interval [i−Δ, i+Δ] is denoted as "$t_{i+\Delta}$."

The time interval "$t_{i+\Delta}$" may be in the past or before 304 the true time value for "now" if the upper bound of the interval is prior to that "now" as measured on a locally accessible clock. Note that, as used herein, time values referring to "now" may be understood to represent the current time. Such current time may be the current time according to some true or verifiable time value (also referred to herein as "true time" or as a "true time value"), may refer to the current time according to some consensus time value, or may refer to the current time as measured using a locally accessible clock. Times may refer to time intervals such as the time interval "$t_{i+\Delta}$" that may be in the past or before 304 the true time value for "now" as described above.

The time interval "$t_{i+\Delta}$" may also be in the future or after 306 the true time value for "now" if the lower bound of the interval is after that now as measured on a locally accessible clock. A time interval "$t_{i+\Delta}$" may be current 308 (i.e., may be neither in the past nor in the future) if the true time value for now is between the lower bound of the interval and the upper bound of the interval as measured on a locally accessible clock. Note that the time interval "$t_{i+\Delta}$" may also be unknown 310. An unknown time may exist when, as illustrated in FIG. 3, there is uncertainty as to the true time value for now as measured on a locally accessible clock, and the time interval for the true time value for now overlaps the time interval "$t_{i+\Delta}$" as measured on a locally accessible clock. When the time interval "$t_{i+\Delta}$" is current 308, or when the time interval "$t_{i+\Delta}$" is unknown 310, a process (e.g., the process illustrated in FIG. 4) that is configured to evaluate time intervals may wait for a short time until the ambiguity is resolved before determining that the time interval is either before 304 the true time value for now or after 306 the true time value for now.

Figure 4:
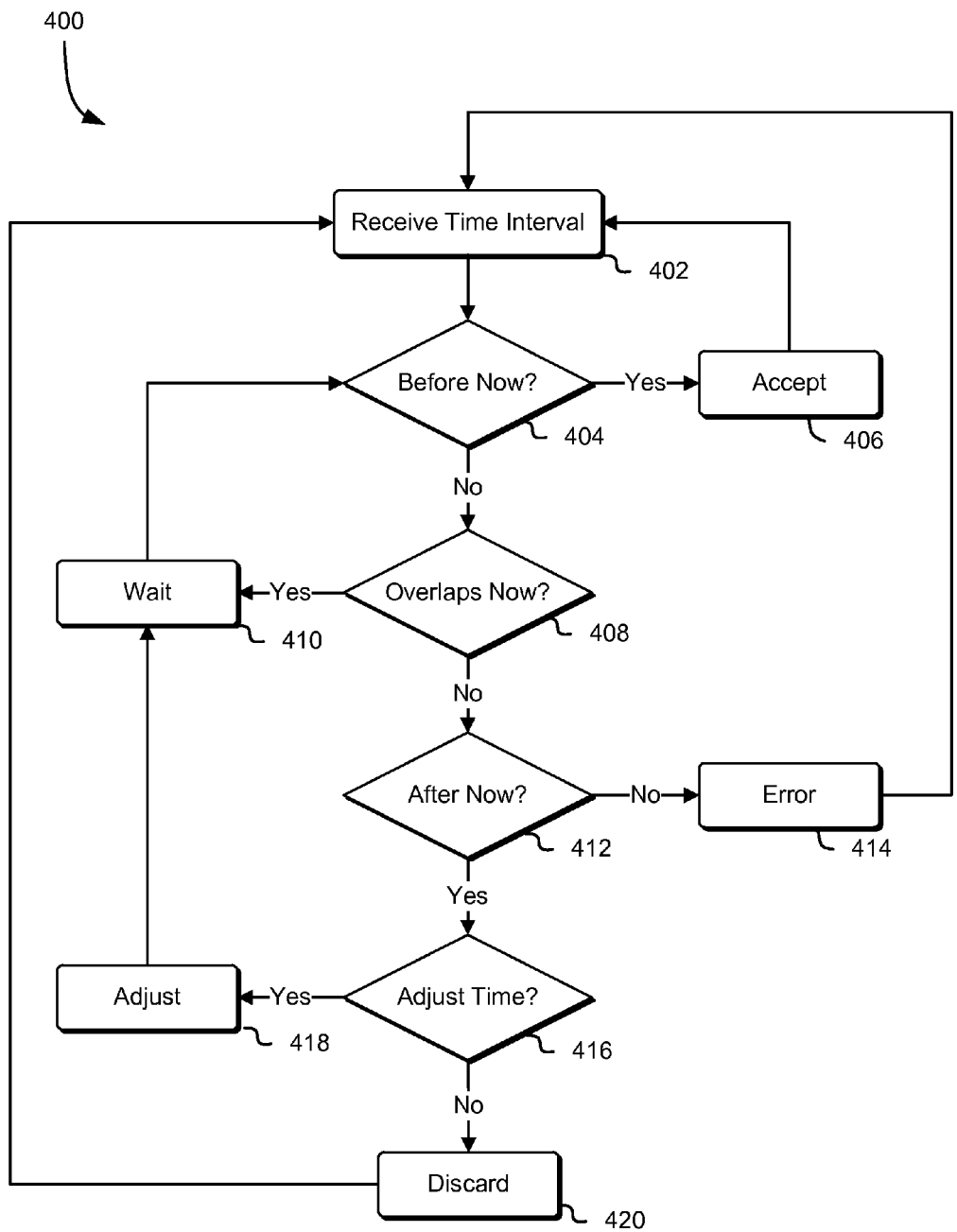
FIG. 4 illustrates an example process for evaluating time intervals.

FIG. 4 illustrates an example process 400 for evaluating time intervals as described in connection with FIG. 3 and in accordance with at least one embodiment. A client such as the client 124 described in connection with FIG. 1 may perform the process illustrated in FIG. 4. A replica location such as the replica location 106 may also perform the process illustrated in FIG. 4. A client or replica may receive a time interval 402 that includes a lower bound and an upper bound as described above. Upon receiving the time interval, it may first be determined if the interval represents a time that is before now 404. An interval may be before now 404 if the upper bound of the time interval is before the current time. For example, a time interval that is from 2015-04-12T12:51:15.123 (12:51 and 15.123 seconds on Apr. 12, 2015) to 2015-04-12T12:51:15.234 (12:51 and 15.234 seconds on Apr. 12, 2015) may be before now 404 if the current time is later than 12:51:15.234 on Apr. 12, 2015. Note that times expressed herein may be expressed according to ISO 8601 (as above) or may be expressed in an abbreviated notation (i.e., 12:51:15.234 on Apr. 12, 2015).

In some embodiments, the current time (or "now") may also be expressed as a time interval so that a time interval may be before now 404 if the upper bound of the time interval is before the lower bound of the now interval. Using the above example of a time interval that is from 2015-04-12T12:51:15.123 to 2015-04-12T12:51:15.234, and an interval (or uncertainty) of current time that is ±0.005 seconds, the time interval may be before now 404 if it is later than 2015-04-12T12:51:15.239 (according to a locally accessible clock).

In the event that it is determined that the time interval is before now 404, the time interval may be accepted 406. It should be noted that a time interval may be accepted 406 for further processing such as, for example, in the process illustrated in FIGS. 7 and 8 below. In the event that it is determined that the time interval is not before now 404, it may next be determined whether the time interval may overlap now 408. A time interval may overlap now 408 if the current time is greater than the lower bound of the time interval and if the current time is less than the upper bound of the time interval. A time interval may also overlap now 408 (e.g., when now is also expressed as an interval) if either the lower bound of the interval for now is between the lower bound of the time interval and the upper bound of the time interval or if the upper bound of the interval for now is between the lower bound of the time interval and the upper bound of the time interval as described in connection with FIG. 3.

In an embodiment, when a time interval may overlap now 408, the client or replica may wait 410 for the passage of some amount of time before attempting again to determine whether the current interval is before now 404. In such an embodiment, the client or replica may cache or store the time interval for later processing. In an embodiment where the client or replica may wait 410 for the passage of some amount of time before attempting again to determine whether the current interval is before now 404, the process to wait 410 for the passage of some amount of time is performed so that any ambiguity associated with whether the time interval is before now 404 may be reduced.

If the time interval is not before now 404 and the time interval does not overlap now 408, it may next be determined whether the time interval is after now 412. A time interval may be after now 412 if the lower bound of the time interval is after the current time or if the lower bound of the time interval is after the upper bound of the interval associated with the current time (or now). If the time interval is not before now 404, the time interval does not overlap now 408, and the time interval is not after now 412, an error 414 may result, which may be processed and/or propagated to one or more other processes for further processing. Conversely, if the time interval is after now 412, then the time interval is in the future.

A time interval that is after now 412 may be an indicator of an error in synchronization between one or more locally accessible clocks. For example, if a time interval from 2015-04-12T12:51:15.123 to 2015-04-12T12:51:15.234 is received at a client before 2015-04-12T12:51:15.123, then it may be an indicator that the locally accessible clock where the time interval was produced is out of synch with the locally accessible clock at the client or replica and/or that both locally accessible clocks are out of synch with true time as described above. In an embodiment, the client or replica may determine whether to adjust local time 416 as a result of receiving a time interval that is after now 412. If it is determined to adjust local time 416, the client or replica may adjust local time 418 by, for example, consulting a more authoritative clock such as that provided by an Internet time server. The client or replica may also wait 410 for the passage of some amount of time before attempting again to determine whether the current interval is before now 404. If it not determined to adjust local time 416, the client or replica may instead discard 420 the time interval as an invalid future time interval.

Figure 5:
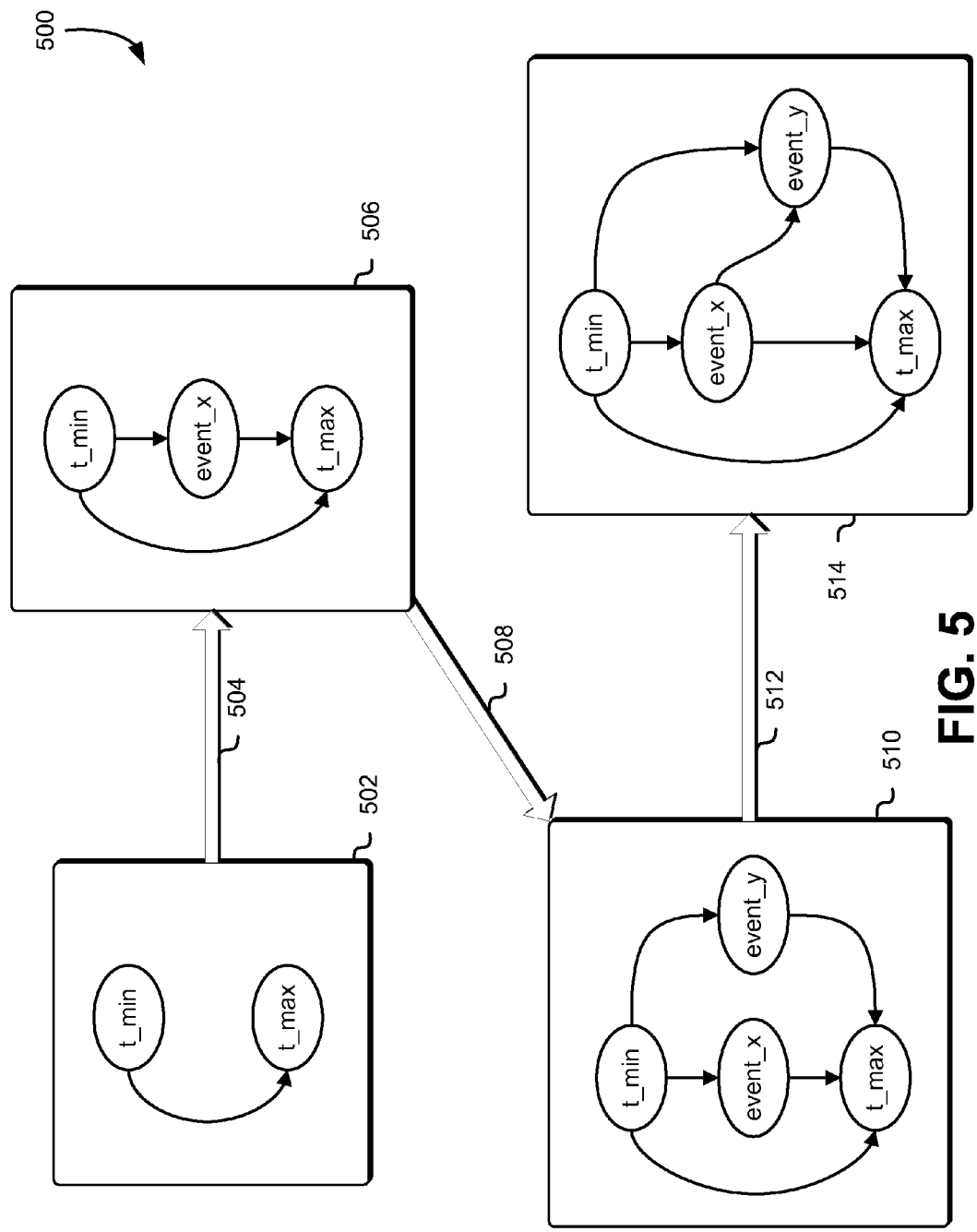
FIG. 5 illustrates an example diagram where an add-only monotonic directed acyclic graph based on time intervals may be created.

FIG. 5 illustrates an example diagram 500 where an add-only monotonic directed acyclic graph may be created based on time intervals as described in connection with FIG. 1 and in accordance with at least one embodiment. An add-only monotonic directed acyclic graph may include a set of nodes and a set of directed edges connecting pairs of nodes of the set of nodes such that each directed edge in the set of directed edges may represent an order of the pair of data events corresponding to the pair of nodes connected by the directed edge based on the monotonic property of the add-only monotonic directed acyclic graph. An add-only monotonic directed acyclic graph is a directed acyclic graph (or "DAG") that is a convergent replicated data type (or "CRDT"). A convergent replicated data type may also be referred to as a "conflict-free replicated data type." A CRDT is a data type that may be used to achieve strong eventual consistency. A CRDT may use this strong eventual consistency to allow data to be replicated by applying all messages to any number of replicas. An instance of a CRDT may be referred to herein as a "convergent replicated data structure" so, for example, an instance of an add-only monotonic directed acyclic graph may also be referred to herein as an example of a convergent replicated data structure. Convergent replicated data types include, but may not be limited to, certain sets, counters, graphs, and trees that are associative, commutative, and idempotent. Provided that the message application is associative, commutative, and idempotent, the messages do not need to be ordered prior to application and successive application of operations at different replicas will consistently converge to the same result.

An operation is associative when two or more consecutive operations of the same type can be re-ordered without changing the result. Examples of associative operations include multiplication (1×2=2×1), addition (2+3=3+2), and set union ({A}U{B}={B}U{A}). Examples of non-associative operations include division (1/2≠2/1) and exponentiation ($2^3 \neq 3^2$). An operation is commutative when the results of the operation are independent of the order that the operations are applied. Examples of commutative operations include addition (1+(2+3)=(1+2)+3), multiplication (2×(3×4)=(2×3)×4), and set union ({A}U({B}U{C})=({A}U{B}) U{C}). Examples of non-commutative operations include division (1/(2/3)≠(1/2)/3) and exponentiation (2 ^(3 ^4)≠(2 ^3)^4) (the "^" operation indicates exponentiation)). An operation is idempotent when a repeated application of the operation yields the same result. Examples of idempotent operations include the logical and ("&") operator (a & b=a & b & b) and set union ({A} U {B}={A}U{B}U{B}). Examples of non-idempotent operations include addition (1+2≠1+2+2) and multiplication (1×2≠1×2×2). An operation that is associative, commutative, and idempotent will consistently converge to the same result at different replicas regardless of the order or application (because the operation is associative and commutative) and regardless of whether operations are applied multiple times (because the operation is idempotent).

Because an add-only monotonic DAG can be seen as a set of vertices {V} and a set of edges {E} connecting pairs of vertices, adding a new vertex is associative, commutative, and idempotent because adding a new vertex is a set union operation ({V}U{new vertex}) and adding a new edge is also associative, commutative, and idempotent because adding a new vertex is also a set union operation ({E}U{new edge}). Thus operations that alter an add-only monotonic DAG are associative, commutative, and idempotent and thus replicas of an add-only monotonic DAG will consistently converge regardless of the order in which those operations are applied.

An add-only monotonic DAG has directed edges between pairs of nodes, each of which is oriented in the same direction as an existing edge in the graph. The initial add-only monotonic DAG 502 illustrated in FIG. 5 starts with a single pair of nodes "t_min" and "t_max" that may represent sentinel value times of positive infinity (also referred to herein as "maximum time") and negative infinity (also referred to herein as "minimum time"). Each add-only monotonic DAG used in the methods, systems, and processes described herein begins with this same initial add-only monotonic DAG 502. The "t_min" node (the minimum time) may also represent a system startup time, or may represent a most recent sample time, or may represent some other such sentinel time value, provided that no events may occur before that sentinel time value. Similarly, the "t_max" node (the maximum time) may represent an anticipated system shutdown time or some other future time provided that no events may occur after that sentinel time value.

The properties of the add-only monotonic DAG may be maintained if the operation to alter the add-only monotonic DAG is an "add between" operation. The add-only monotonic DAG 506 is the result of applying 504 an "add between" operation for a node representing an event "event_x" to the initial add-only monotonic DAG 502. The event "event_x" may have a time and/or a time interval associated with the event as described herein. Because time is monotonic (i.e., only increases) and because the initial add-only monotonic DAG 502 has sentinel values, the "add between" operation maintains the monotonic nature of the add-only monotonic DAG. Similarly because adding a vertex between any two other vertices where there is an existing edge is associative, commutative, and idempotent (because those properties apply to set union as described above), an add-only monotonic DAG is a CRDT.

The add-only monotonic DAG 510 that results from adding 508 a second event "event_y" to the add-only monotonic DAG 506. Note that the add-only monotonic DAG 510 does not show or imply any order of the events "event_x" and "event_y." That is, the same add-only monotonic DAG 510 would result regardless of whether "event_x" came before "event_y" or "event_y" came before "event_x." The order of the events may be resolved by providing an additional operation "add edge" that allows for the addition of an edge between pairs of existing vertices provided that there is a pre-existing edge in the graph that is oriented in the same direction as the new edge (i.e., that the monotonic property is maintained). Any operation that adds a new edge (e.g., the "add between" operation or the "add edge" operation) may add the edge connecting a first node to a second node. The first node may also be referred to herein as a "source node" and the second node may be referred to herein as a "sink node." As described above, an operation to add an edge to the set of edges is equivalent to the set union operation, so the "add edge" operation is associative, commutative, and idempotent. The add-only monotonic DAG 514 that results from adding 512 the edge between "event_x" and "event_y" now has an order of events indicating that "event_x" precedes "event_y" but the add-only monotonic DAG 514 is still a CRDT.

Figure 6:
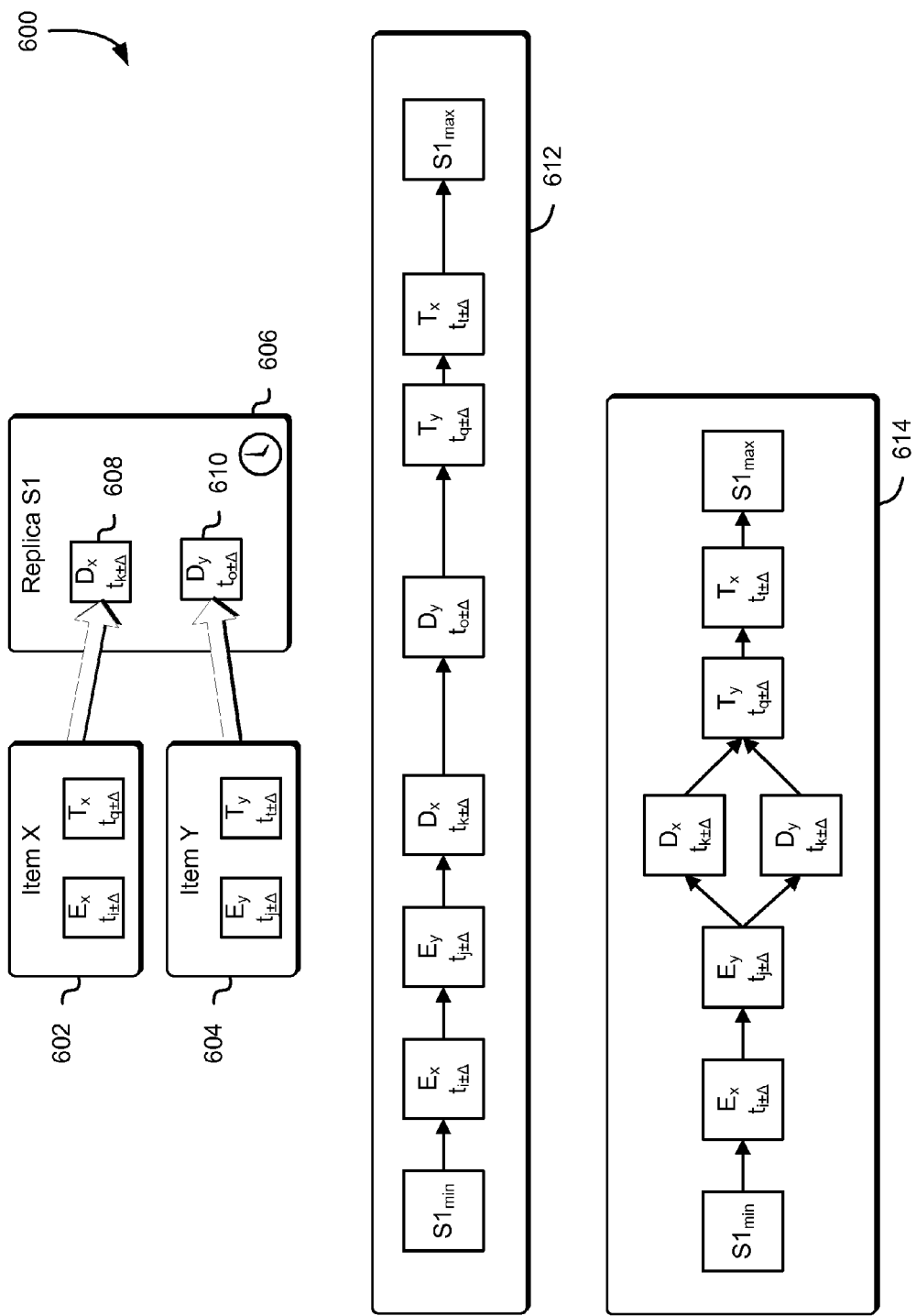
FIG. 6 illustrates an example diagram where data from multiple clients may be received at a replica site and may be ordered based on properties of the data and of locally accessible clocks.

FIG. 6 illustrates an example diagram 600 where data from multiple clients may be received at a replica site and may be ordered based on properties of the data and of locally accessible clocks as described in connection with FIG. 1 and in accordance with at least one embodiment. A first item 602 (denoted as "Item X") may be received at a replica 606 (denoted as "Replica S1") at nearly the same time as a second item 604 (denoted as "Item Y"). The first item 602 may have an event time $E_x$ and a timeout time $T_x$, one or both of which may be a time interval (e.g., $E_x = t_{i+\Delta}$). The second item 604 may also have an event time $E_y$ and a timeout time $T_y$, one or both of which may be a time interval. In the example illustrated in FIG. 6, each of the items also has a delivery time, which may represent the time that the item was received at the replica 606. "Item X" has a delivery time 608 $D_x$ and "Item Y" has a delivery time 610 $D_y$, both of which may be based on the locally accessible clock associated with the replica 606.

The add-only monotonic DAG 612 represents an ordered list of events from a minimum sentinel time value "$S1_{min}$" to a maximum sentinel time value "$S1_{max}$." In the add-only monotonic DAG 612, the order is established because, $E_x$ is before $E_y$ according to the time intervals, $E_y$ is before $D_x$ according to the time intervals, and so on. The add-only monotonic DAG 612 may be produced by first adding the interval $E_x$ between sentinel values $S1_{min}$ and $S1_{max}$, then adding the timeout interval $T_x$ between the interval $E_x$ and the sentinel value $S1_{max}$, then adding the interval $E_y$ between $E_x$ and $T_x$, then adding the timeout interval $T_y$ between $E_y$ and $T_x$, then adding delivery interval $D_x$ between $E_y$ and $T_y$, and finally by adding the delivery interval $D_y$ between $D_x$ and $T_y$.

In the add-only monotonic DAG 614, the order may not be established if, for example, both items arrived at the replica 606 at the same time (i.e., $D_x$ equals $D_y$). The add-only monotonic DAG 614 may be produced by first adding the interval $E_x$ between sentinel values $S1_{min}$ and $S1_{max}$, then adding the timeout interval $T_x$ between the interval $E_x$ and the sentinel value $S1_{max}$, then adding the interval $E_y$ between $E_x$ and $T_x$, and then adding the timeout interval $T_y$ between $E_y$ and $T_x$. Because there may be no established order between $D_x$ and $D_y$, both delivery interval $D_x$ and delivery interval $D_y$ may be added between $E_y$ and $T_y$.

Figure 7:
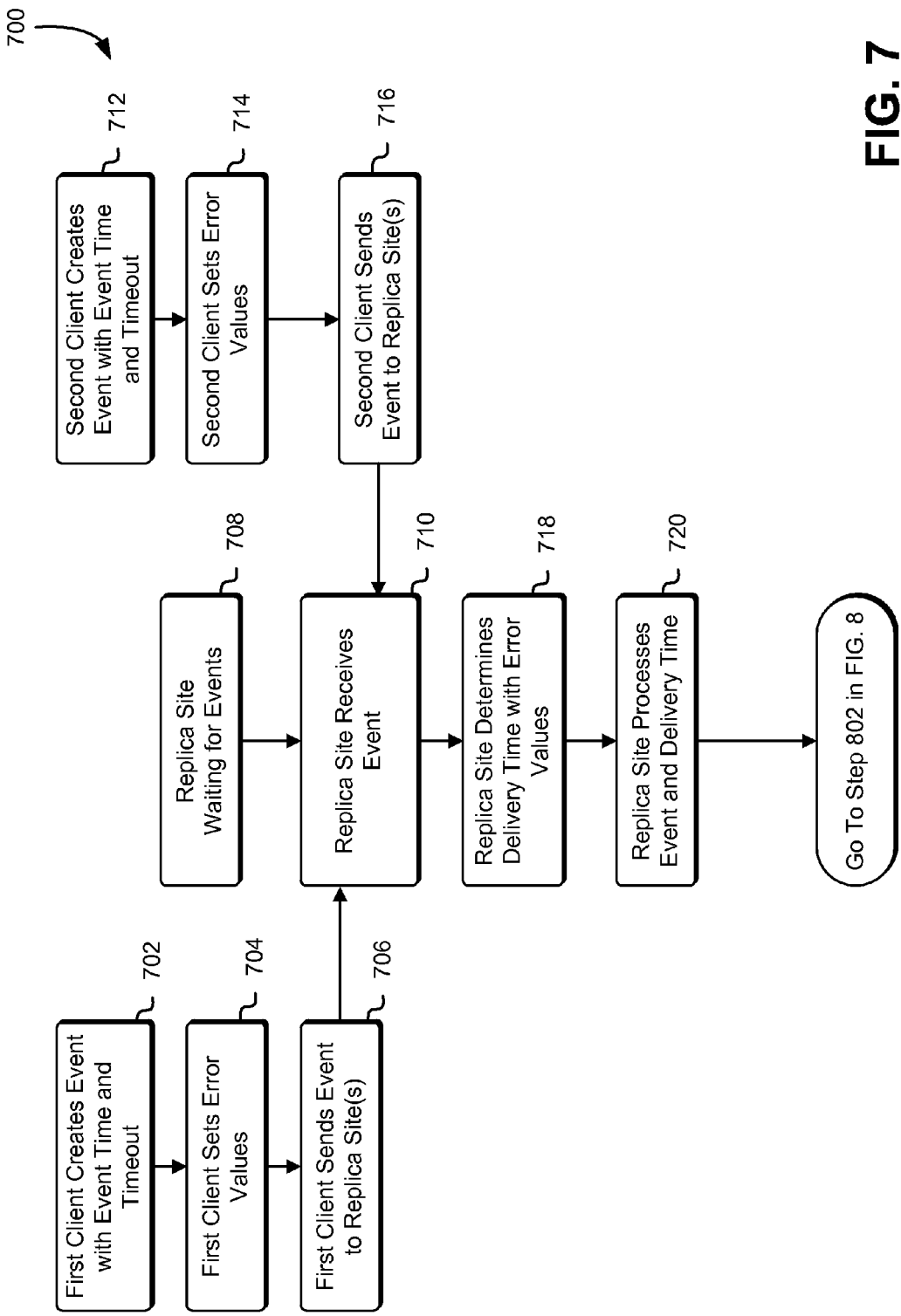
FIGS. 7 and 8 illustrate an example process for receiving data from multiple clients and ordering data properties.
Figure 8:
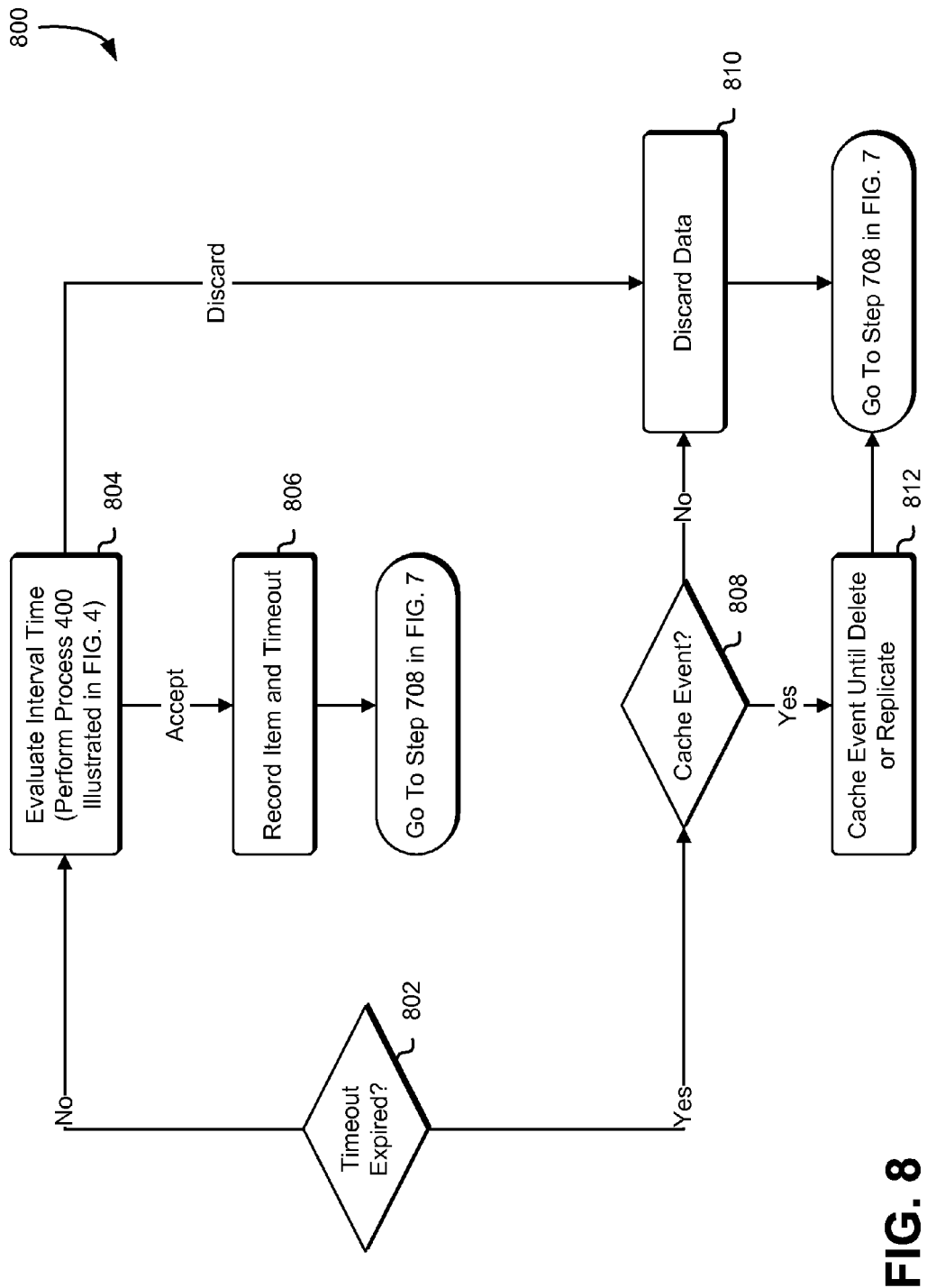

FIGS. 7 and 8 illustrate an example process for receiving data from multiple clients and ordering data properties as described in connection with FIGS. 1 and 2 and in accordance with at least one embodiment. The first part 700 of the example process is illustrated in FIG. 7. The second part 800 of the example process is illustrated in FIG. 8. A client such as the client 124 described in connection with FIG. 1 may perform a part of the first part 700 of the process illustrated in FIGS. 7 and 8. A replica location such as the replica location 106 may also perform a part of the first part 700 of the process illustrated in FIGS. 7 and 8. A replica location such as the replica location 106 may perform the second part 800 of the process illustrated in FIGS. 7 and 8.

In the first part 700 of the example process, a first client may create or generate an event with event data, an event time, and/or a timeout 702. The first client may then create or generate error values 704 for the event time and/or for the timeout as described herein. The first client may then send the event 706 to one or more replica sites.

A second client may also create or generate an event with event data, an event time, and/or a timeout 712. The second client may then create or generate error values 714 for the event time and/or for the timeout as described herein. The second client may then send the event 716 to one or more replica sites.

A replica site may be configured to receive 708 the events generated by the clients. When the replica site receives an event 710, the replica site may first determine the delivery time of the event based on a locally accessible clock and may also record the event time, the timeout, and the delivery time. The replica site may perform one or more operations 720 to process the event time, the timeout, and/or the delivery time prior to, or subsequent to, recording the event time, the timeout, and the delivery time such as, for example, determining whether the event contains valid data, determining whether the time values are valid, or other such operations.

Proceeding to the second part 800 of the example process, the replica site may then perform one or more operations to determine 802 whether the timeout has expired for the event as described herein. If the timeout has not expired, the replica site may evaluate one or more interval times 804 using the example process 400 illustrated in FIG. 4. If, as a result of evaluating the one or more interval time, it is determined that the interval time should be accepted, the replica site may record the event, the timeout, and the delivery time and then the replica site may return to the first part 700 of the example process to receive 708 additional events generated by the clients. In an embodiment, the replica site may record the event time, the timeout, and the delivery time using an add-only monotonic DAG such as the add-only monotonic DAG described in FIG. 5. If, as a result of evaluating the one or more interval times 804 using the example process 400 illustrated in FIG. 4., it is determined that the interval time should be discarded, the replica site may discard 810 one or more parts of the event data and then may also return to the first part 700 of the example process to receive 708 additional events generated by the clients.

If the timeout has expired, the replica site may perform one or more operations to determine whether the event data should be cached 808 for later processing. The replica site may determine that the event data should be cached 808 for later processing if the timeout is in an uncertain state (i.e., neither in the past nor in the future). If it is determined that the event data should be cached 808 for later processing, the replica site may cache the event data 812 until either a request to delete the item (based on, for example, the timeout occurring) or to replicate the data is received. The replica site may then return to the first part 700 of the example process to receive 708 additional events generated by the clients. If it is not determined that the event data should be cached 808 for later processing, the replica site may discard 810 one or more parts of the event data and then may also return to the first part 700 of the example process to receive 708 additional events generated by the clients.

Figure 9:
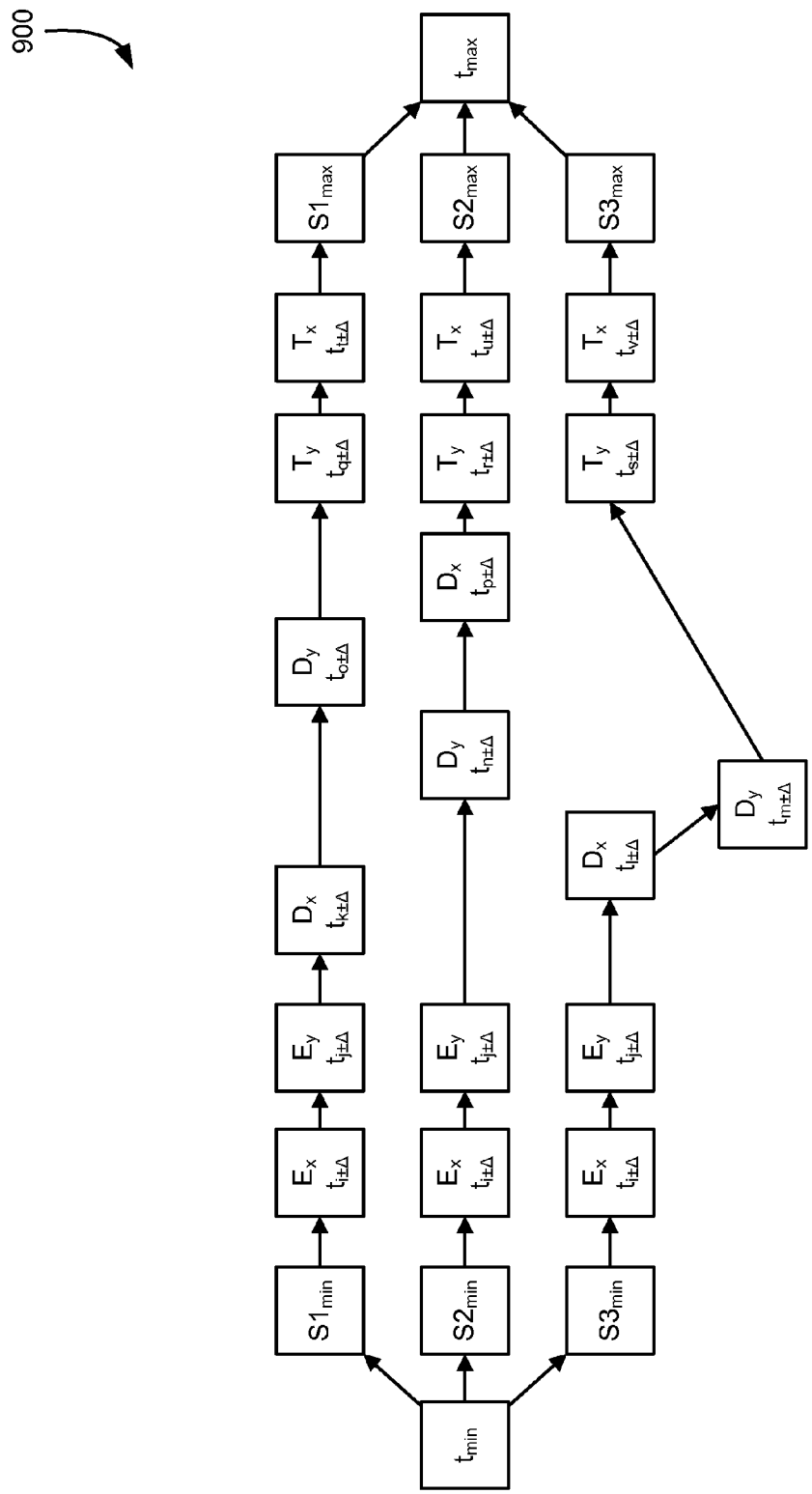
FIG. 9 illustrates an example diagram where data from multiple clients may be received at multiple replica sites and may be ordered based on properties of the event data using locally accessible clocks.

FIG. 9 illustrates an example diagram 900 where event data from multiple clients may be received at multiple replica sites and may be ordered based on properties of the data using locally accessible clocks as described in connection with FIGS. 1 and 2 and in accordance with at least one embodiment. Each "branch" or subgraph of the add-only monotonic DAG (i.e., from $S1_{min}$ to $S1_{max}$, from $S2_{min}$ to $S2_{max}$, and from $S3_{min}$ to $S3_{max}$) is an add-only monotonic DAG produced as described in FIG. 5. Because set union is associative, commutative, and idempotent, the set union of the three branches is also a CRDT add-only monotonic DAG.

Figure 10:
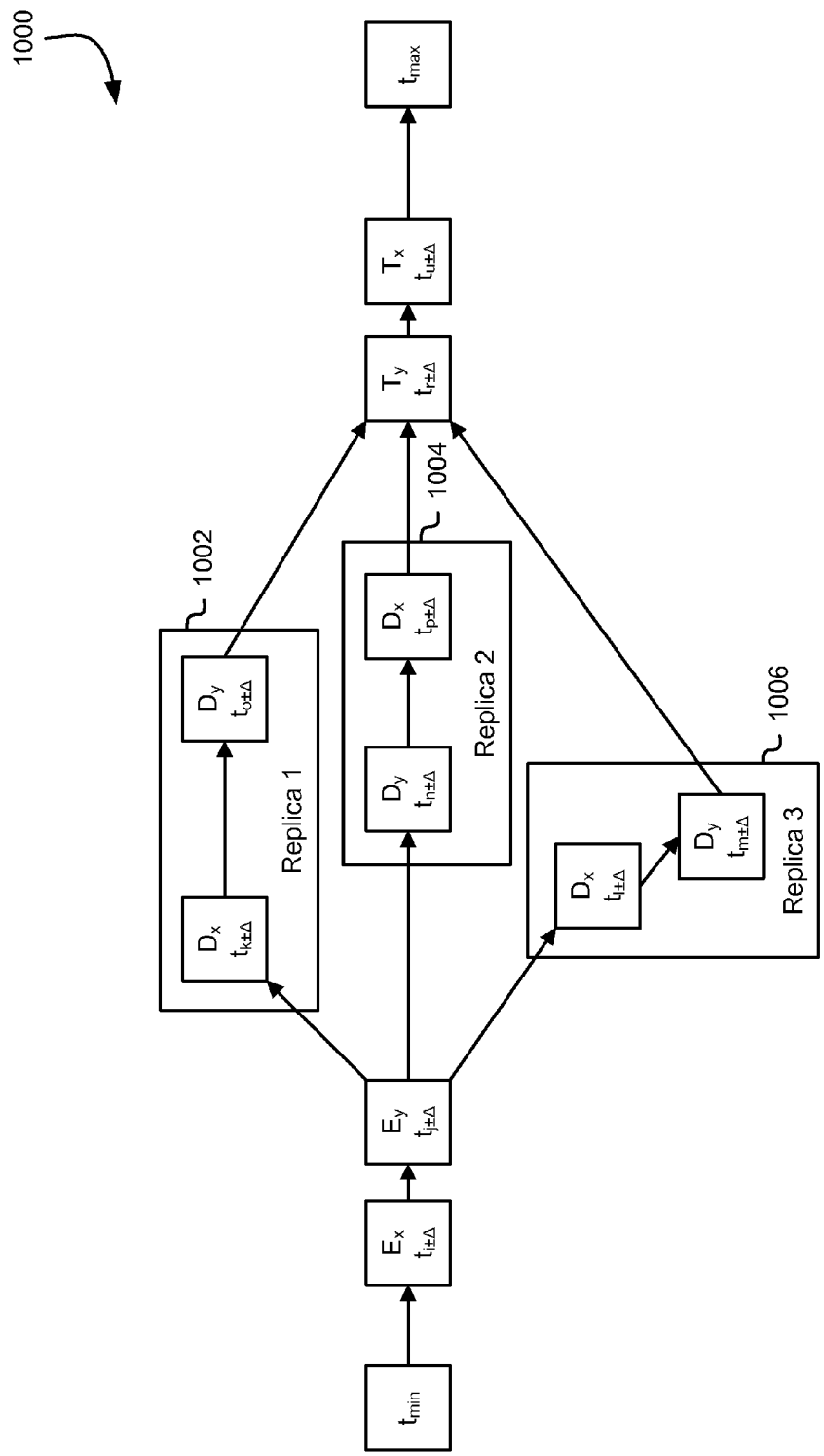
FIG. 10 illustrates an example diagram for grouping event data in multiple replica sites based on shared data properties.

FIG. 10 illustrates an example diagram 1000 for grouping event data in a monotonic add-only DAG from multiple replica sites based on shared data properties as described in connection with FIGS. 1 and 2 and in accordance with at least one embodiment. The example diagram 1000 is the result of replicating all intervals between replica sites and removing the $S_{min}$ and $S_{max}$ placeholders from the example diagram 900 illustrated in FIG. 9. The delivery times $D_x$ and $D_y$ 1002 from the first replica site are denoted as "Replica 1." The delivery times $D_x$ and $D_y$ 1004 from the second replica site are denoted as "Replica 2." The delivery times $D_x$ and $D_y$ 1006 from the third replica site are denoted as "Replica 3."

It is from this reduced graph that the data order may be resolved by recursively looking for items delivered to some quorum of replicas between $t_{min}$ and the lowest timeout interval that is less than the current locally accessible time. In the example illustrated in FIG. 10, the order may be resolved to "Item Y" followed by "Item X." It should be noted that reading data from any two replicas of the three replicas will yield the same order. For example, "Replica 1" and "Replica 2" have an order $[D_x, D_y, D_y, D_x]$ (the values are read from the latest part of the add-only monotonic DAG) that resolves to $[D_y, D_x]$ because the quorum for $D_y$ occurs before the quorum for $D_x$. "Replica 1" and "Replica 3" have an order $[D_y, D_y, D_x, D_x]$ that also resolves to $[D_y, D_x]$ because the quorum for $D_y$ occurs before the quorum for $D_x$. "Replica 2" and "Replica 3" have an order $[D_x, D_y, D_x, D_x]$ that also resolves to $[D_y, D_x]$ because the quorum for $D_y$ occurs before the quorum for $D_x$.

Figure 11:
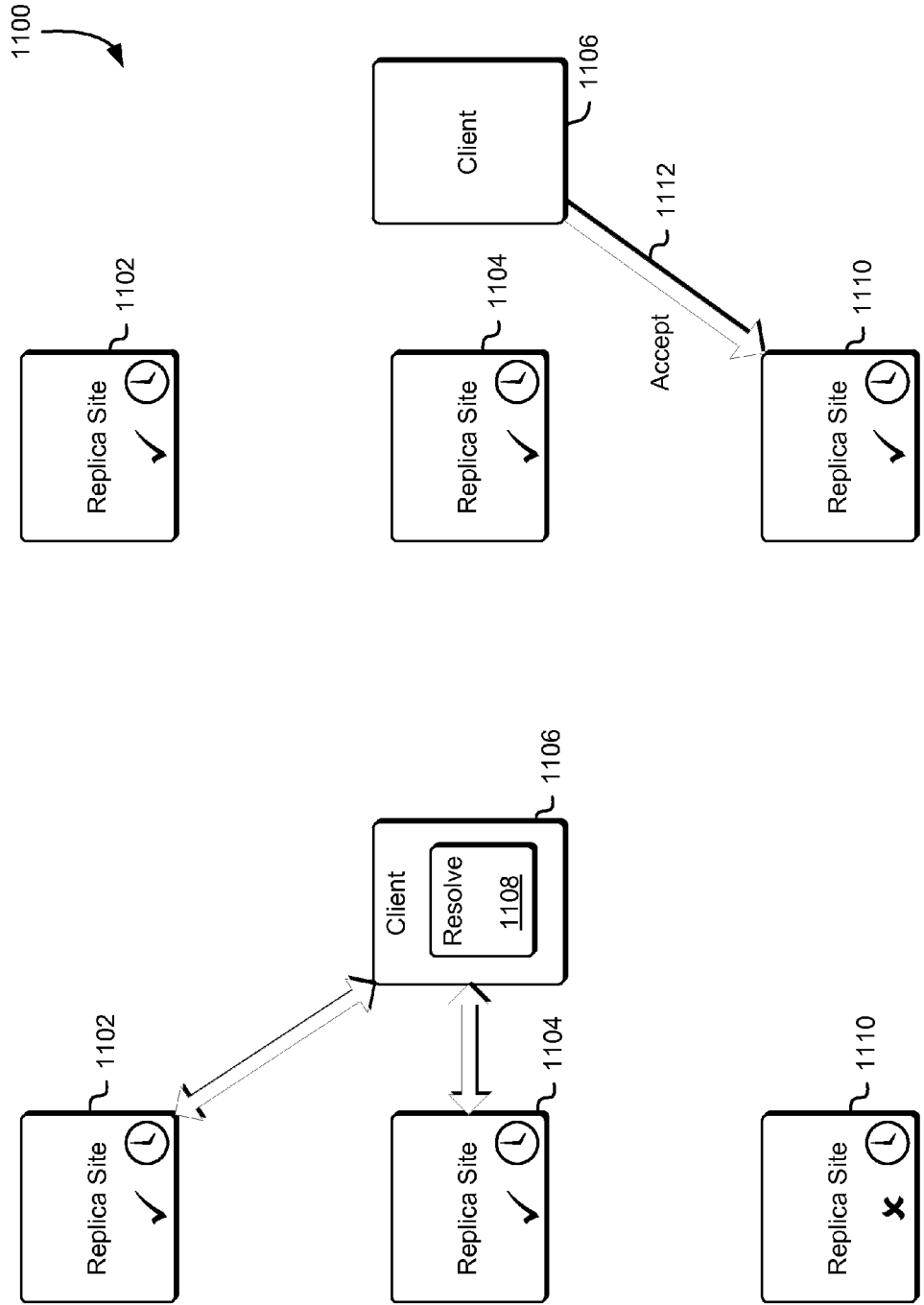
FIG. 11 illustrates an example diagram where the resolved order of data items may be replicated in replica sites by a client.

FIG. 11 illustrates an example diagram 1100 where the resolved order of data items may be replicated in replica sites by a client as described in connection with FIGS. 1 and 2 and in accordance with at least one embodiment. A client 1106 may resolve 1108 the order of a distributed data set using the techniques described herein by obtaining a consensus from replica site 1102 and replica site 1104. A third replica site 1110 may not have the resolved order of the distributed data set either because it contained a different order or because the quorum was reached before the third replica site 1110 was queried. The client may then cause the third replica site 1110 to accept 1112 the consensus resolved order, ensuring that a unanimous consensus exists in the distributed system.

Figure 12:
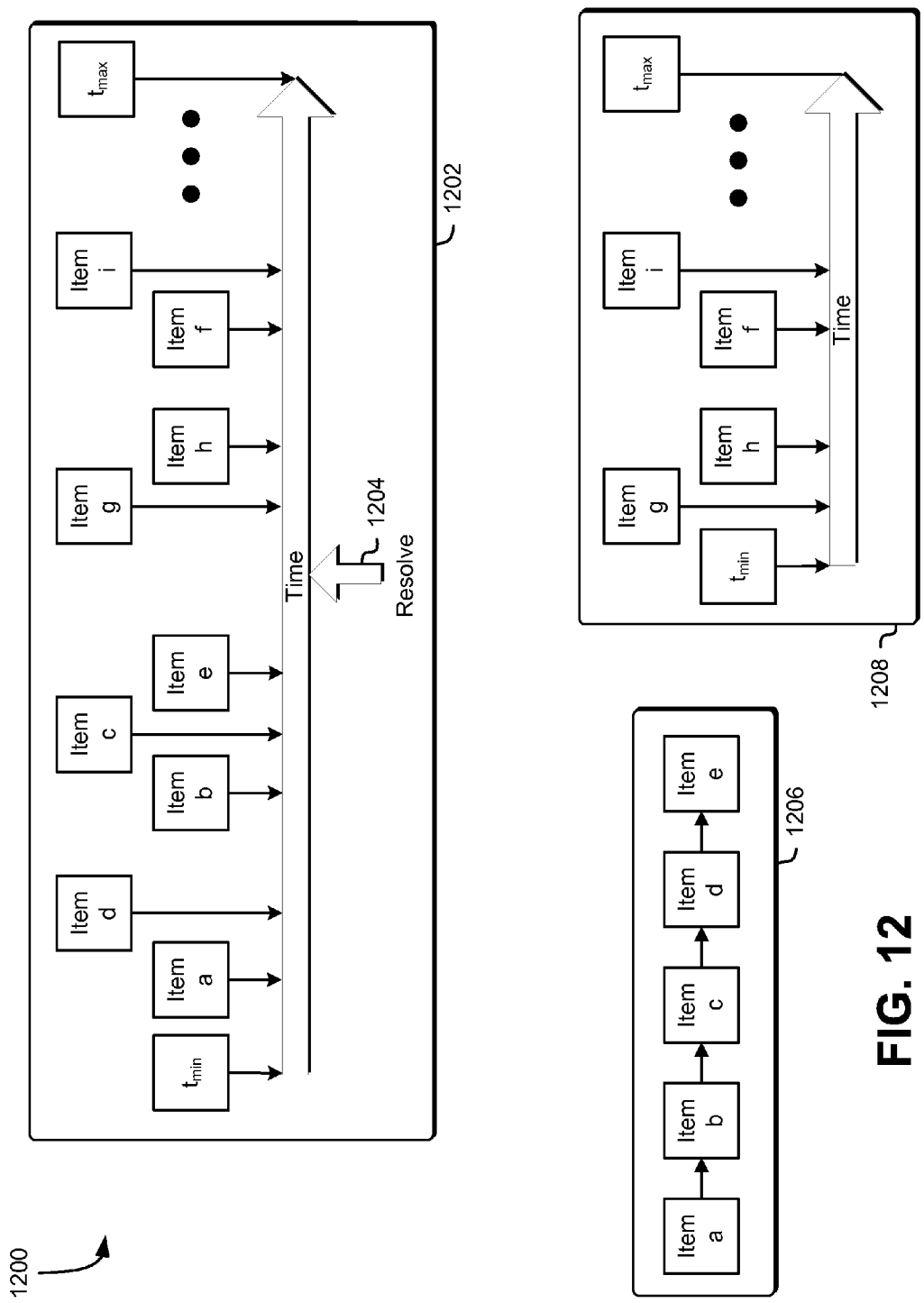
FIG. 12 illustrates an example diagram where a shared data structure may be produced from a resolved order of data items from multiple replica sites.

FIG. 12 illustrates an example diagram 1200 where a shared data structure may be produced from a resolved order of data items received from multiple replica sites as described in connection with FIGS. 1 and 2 and in accordance with at least one embodiment. Events may exist in an add-only monotonic DAG with time entries 1202 between $t_{min}$ and $t_{max}$ in the order shown. In the example illustrated in FIG. 12, the order shown may not be the resolved order. At a time 1204, the order may be resolved as described herein. Such a resolution may produce an snapshot of the ordered data set 1206 (a queue in the example illustrated) up to the time 1204 while the remaining elements in the add-only monotonic DAG with time entries 1208 may be updated with a new $t_{min}$ value.

Such snapshots may be used to generate copies of the distributed data set up to the time 1204 that may be used to reconstruct a new replica site (or new replica location) in the event that an existing replica site fails or otherwise crashes. For example, if the distributed data set is a database, and one of the replicas of the database are lost, a new replica site (or new replica location) with the database may be constructed from the most recent snapshot, and may also be updated with the unordered data events from the add-only monotonic DAG with time entries 1208. In an embodiment, a new replica may be produced by any two other replica sites provided the any two other replica sites have a consensus as to the ordered data set 1206 (a queue in the example illustrated) up to the time 1204. The new replica may then apply the remaining elements in the add-only monotonic DAG with time entries 1208 with the new $t_{min}$ value.

Figure 13:
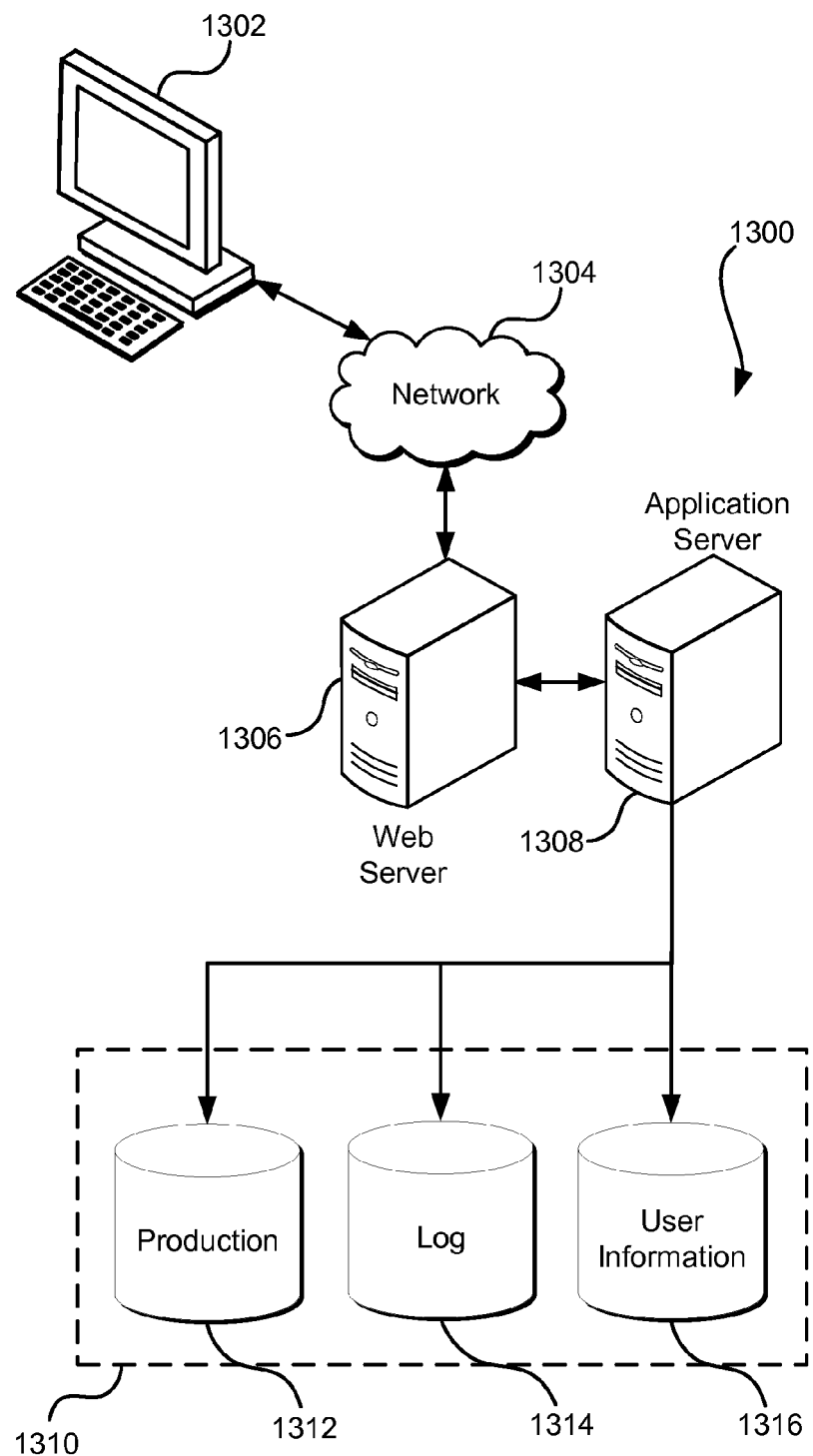
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages, or information over an appropriate network 1304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1302 and the application server 1308, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1310 can include several separate data tables, databases, data documents, dynamic data storage schemes and/or other data storage mechanisms and media for storing data relating to a particular aspect of the present disclosure. For example, the data store illustrated may include mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. The application server 1308 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for generating a distributed message queue, comprising:

under the control of one or more computer systems configured with executable instructions, receiving, at a set of replica locations, a set of data events, each data event of the set of data events including a corresponding message time and a corresponding timeout time;

determining whether each data event of the set of data events is valid based at least in part on comparing a delivery time to the timeout time, the delivery time obtained from a locally accessible clock associated with the replica location, the delivery time corresponding to a time that the data event is received at the replica location;

storing the set of data events in an add-only monotonic directed acyclic graph, the add-only monotonic directed acyclic graph comprising a set of nodes, each node of the set of nodes corresponding to a data event of the set of data events, the add-only monotonic directed acyclic graph further comprising a set of directed edges connecting pairs of nodes of the set of nodes, each directed edge in the set of directed edges representing an order of a pair of data events corresponding to the pair of nodes connected by the directed edge; and producing a consensus order of the set of data events by repeatedly:
  selecting, for each replica location of the set of replica locations, a corresponding subgraph of the add-only monotonic directed acyclic graph, each data event of a subset of the set of data events corresponding to the subgraph selected as a result of the timeout time being less than a time value obtained from the locally accessible clock; and
  determining the consensus order based at least in part on a set of most frequent directed edges of the corresponding subgraph from each replica location; and inserting one or more messages into the distributed message queue in an order based at least in part on the consensus order.

2. The computer-implemented method of claim 1, wherein determining the consensus order is further based at least in part on a cardinality of the set of most frequent directed edges exceeding a threshold value.

3. The computer-implemented method of claim 2, wherein the threshold value is greater than half of the cardinality of the set of replica locations.

4. The computer-implemented method of claim 1, wherein:
  the message time is expressed as a first time interval, the first time interval including an upper bound for the message time and a lower bound for the message time;
  the timeout time is expressed as a second time interval, the second time interval including an upper bound for the timeout time and a lower bound for the timeout time; and
  the delivery time is expressed as a third time interval, the third time interval including an upper bound for the delivery time and a lower bound for the delivery time.

5. A system, comprising at least one computing device configured to implement one or more services, wherein the one or more services are configured to:
  receive a set of data events at a replica location, each data event of the set of data events including a corresponding creation time and a corresponding timeout time;
  determine whether each data event of the set of data events is valid based at least in part on comparing a delivery time to the timeout time, the delivery time obtained from a first locally accessible clock associated with the replica location for each data event of the set of data events, the delivery time corresponding to a time that the data event is received at the replica location;
  add each data event of the set of data events to a convergent replicated data structure;
  determine one or more selected subsets of data events corresponding to one or more different replica locations, each data event of the one or more selected subsets of data events selected as a result of the timeout time of each data event being less than a time value obtained from one or more second locally accessible clocks associated with the one or more different replica locations;
  order the set of data events in the convergent replicated data structure based at least in part on the one or more selected subsets of data events; and
  generate a distributed data representation of the set of data events based at least in part on the ordered set of data events in the convergent replicated data structure.

6. The system of claim 5, wherein the convergent replicated data structure is an add-only monotonic directed acyclic graph, the add-only monotonic directed acyclic graph comprising:
  a set of nodes, each node of the set of nodes corresponding to a data event of the set of data events, the set of nodes including a first node corresponding to a minimum time and a second node corresponding to a maximum time; and
  a set of directed edges connecting pairs of nodes of the set of nodes, each directed edge in the set of directed edges representing an order of a pair of data events corresponding to the pair of nodes connected by the directed edge, the set of directed edges including a first directed edge connecting the first node to the second node.

7. The system of claim 6, wherein causing the replica location to add each data event of the set of data events to the convergent replicated data structure comprises performing one or more operations that cause the replica location to at least:
  select a pair of nodes from the add-only monotonic directed acyclic graph, the pair of nodes comprising a source node and a sink node, the source node connected to the sink node by a first directed edge, the pair of nodes selected based on a corresponding data event;
  add a new node to the set of nodes corresponding to corresponding data event;
  add a first new directed edge connecting the source node to the new node to the set of directed edges; and
  add a second new directed edge connecting the new node to the sink node to the set of directed edges.

8. The system of claim 6, wherein causing the replica location to order the set of data events in the convergent replicated data structure comprises performing one or more operations that cause the replica location to at least:
  select a first node from the add-only monotonic directed acyclic graph;
  select a second node from the add-only monotonic directed acyclic graph, the second node selected based at least in part on the corresponding timeout time of the second node being after the corresponding timeout time of the first node, the second node selected from a set of nodes not connected to the first node by a directed edge; and add a new directed edge connecting the first node to the second node to the set of directed edges.

9. The system of claim 5, wherein the distributed data representation of the set of data events is a message queue.

10. The system of claim 5, wherein the distributed data representation of the set of data events is a logging service.

11. The system of claim 5, wherein the distributed data representation of the set of data events is a distributed database.

12. The system of claim 5, wherein the distributed data representation of the set of data events is a distributed graph.

13. A non-transitory computer-readable storage medium having stored thereon executable instructions that, when executed by one or more processors of a computer system, cause the computer system to at least:
  receive a set of data items at a first replica location of a set of replica locations, each data item of the set of data items including a set of time values, the set of time values including:
    a delivery time obtained from a first clock of the first replica location;
    a creation time obtained from a second clock;
    a timeout time based at least in part on the creation time; and
  store the set of data items in a convergent replicated data structure in an order based at least in part on the set of time values corresponding to each data item of the set of data items; and
  update the order the set of data items in the convergent replicated data structure based at least in part on a corresponding selected subset of data items from one or more replica locations of the set of replica locations that differ from the first replica location, each data item of a corresponding selected subset of data events selected as a result of a corresponding timeout time being less than a time value obtained from a corresponding third clock associated with each of the one or more different replica locations.

14. The non-transitory computer-readable storage medium of claim 13, wherein the instructions further comprise instructions that, when executed by the one or more processors, cause the computer system to generate a distributed data representation of the set of data items based at least in part on the order of the set of data items in the convergent replicated data structure.

15. The non-transitory computer-readable storage medium of claim 14, wherein the instructions further comprise instructions that, when executed by the one or more processors, cause the computer system to generate a snapshot of the data items from the distributed data representation at a time obtained from the first clock.

16. The non-transitory computer-readable storage medium of claim 15, wherein the instructions further comprise instructions that, when executed by the one or more processors, cause the computer system to create a new replica location in the set of replica locations, the new replica location created based at least in part on the snapshot of the data items.

17. The non-transitory computer-readable storage medium of claim 13, wherein the instructions that cause the computer system to update the order the set of data items in the convergent replicated data structure further include instructions that cause the computer system to update the order the set of data items in one or more of the one or more replica locations of the set of replica locations that differ from the first replica location based at least in part on the updated order of the set of data items in the convergent replicated data structure.

18. The non-transitory computer-readable storage medium of claim 13, wherein each time value of the set of time values is a time interval.

19. The non-transitory computer-readable storage medium of claim 18, wherein each time interval includes a corresponding lower time bound and a corresponding upper time bound, the lower time bound and the upper time bound calculated based on a boundary probability exceeding a threshold value, the boundary probability based on a probability that the time associated with the time interval is greater than the lower time bound and that the time associated with the time interval is less than the upper time bound.

20. The non-transitory computer-readable storage medium of claim 13, wherein:
  the first clock is a first global positioning system enabled Cesium atomic clock;
  the second clock is a second global positioning system enabled Cesium atomic clock; and
  the corresponding third clock is a third global positioning system enabled Cesium atomic clock.

* * * * *